United States Patent [19]

Robinson et al.

[11] Patent Number: 4,993,460

[45] Date of Patent: Feb. 19, 1991

[54] SIGHT GLASS INCORPORATED INTO FUEL DISPENSING NOZZLE

[75] Inventors: Thomas L. Robinson, Robertsville; Thomas O. Mitchell, Maryland Heights; Fink, Sr. Arthur C., Lonedell, all of Mo.

[73] Assignee: Husky Corporation, Pacific, Mo.

[21] Appl. No.: 497,588

[22] Filed: Mar. 22, 1990

[51] Int. Cl.⁵ .......................... B65B 1/30; G01F 15/00

[52] U.S. Cl. .......................................... 141/94; 116/273

[58] Field of Search ..................... 141/94, 95, 96, 392; 116/273, 274, 276, DIG. 7, 264; 137/559

[56] References Cited

U.S. PATENT DOCUMENTS

| | | | |
|---|---|---|---|
| 1,287,985 | 12/1918 | Hatmaker | 222/40 |
| 1,730,118 | 10/1929 | Cobb | 116/273 |
| 1,730,127 | 10/1929 | Davenport | 116/273 |
| 1,865,002 | 6/1932 | Griffin | 116/274 |
| 2,014,691 | 9/1935 | Morgan | 116/274 |
| 2,027,696 | 1/1936 | Morgan | 116/274 |
| 2,231,907 | 2/1941 | Harris | 141/96 |
| 2,387,805 | 10/1945 | Olsen | 116/274 |
| 2,587,839 | 3/1952 | Grise | 141/96 |
| 2,847,969 | 8/1958 | Woodruff | 116/273 |
| 2,884,891 | 5/1959 | Barker | 116/274 |
| 3,085,424 | 4/1963 | Berg | 116/276 |
| 3,334,821 | 8/1967 | Garrison | 239/589 |
| 3,487,809 | 1/1970 | Seaborne | 116/274 |
| 4,105,095 | 8/1978 | Thrasher, Jr. | 184/55.2 |
| 4,378,824 | 4/1983 | Carder, Sr. | 141/392 |
| 4,559,982 | 12/1985 | Fink, Jr. | 141/206 |
| 4,745,877 | 5/1988 | Chang | 116/274 |
| 4,819,577 | 4/1989 | Campau | 116/264 |

*Primary Examiner*—Henry J. Recla
*Assistant Examiner*—Keith Kupferchmid
*Attorney, Agent, or Firm*—Paul M. Denk

[57] ABSTRACT

A fuel dispensing nozzle incorporating sight glass in the vicinity of its poppet valve, which a sight glass is sealingly engaged within the body cap, comprising a lens of either the magnifying or nonmagnifying type, to provide a ready viewing of any activation device within the poppet cavity, either in the form of spinner, or spheres, that are rotated or agitated, as when fuel under pressure is being delivered through the nozzle and to the fuel tank of a vehicle.

10 Claims, 2 Drawing Sheets

SIGHT GLASS INCORPORATED INTO FUEL DISPENSING NOZZLE

BACKGROUND OF THE INVENTION

In earlier days, when gasoline pumps were initially installed for dispensing fuel to early model automobiles, one can remember the upper glass portion for such dispensers, and which usually included some type of ball valve, or the like, which would be moved under the pressure of the flowing fuel to provide an indication to the driver and vehicle occupants that gasoline was actually being dispensed, and could visually be observed in this manner.

Of more recent origin, other types of fuel flow indicators are available, and can be used a related purpose. For example, the gasoline dispensing pump, as shown in the U.S. Pat. No. 1,287,985, provides a dial means upon its dispenser for providing figures relating to the quantities of gasoline being dispensed by the pump. In addition, a transparent cylinder was provided with this early pump, so that one may watch the flow of fuel therethrough. This is somewhat related to the style of gasoline pump as previously described, and which prevailed in the early days of vehicular travel.

The U.S. Pat. No. 1,730,127, to Davenport, shows an oil display pump, which also incorporated a sight tube, or chamber, and provided means to furnish a positive indication of the flow of oil therethrough, which may possibly have meant to be gasoline, through the elevation of the shown balls as the oil was being forced through the valve by means of its pump.

The U.S. Pat. No. 2,014,691, to Morgan, discloses another form of liquid flow indicator. This indicator apparently incorporated a cone shaped cylindrical portion that was turned upon the exertion of the pressure of the flowing liquid against its rotor, so as to provide a visual display, as through its housing, or its associated cylindrical tube, of the flow of liquid, such as gasoline, through the operations of its pump.

Another U.S. Pat. No. 2,027,696, to Morgan, shows a sight glass similar to that as previously explained, but in this particular instance, apparently providing for a turning of a helical tube to furnish an indication of the flow of fuel through the dispensing apparatus during its actuation.

The U.S. Pat. No. 2,231,907, to Harris, discloses a different form of indicating nozzle, which in this particular instance, affords a form of sight glass within the spout itself, rather than within its dispensing nozzle or mechanism.

A U.S. Pat. No. 2,387,805, to Olson, provides a visual fluid flow indicator, such as in a gasoline dispensing device, and which incorporates its own self-cleaning mechanism, in the form of indicator brushes. This device included hemispherical lenses or windows of glass as can be seen.

The U.S. Pat. No. 2,587,839, to Grise, discloses an automatic shut-off valve and signal for hose nozzles. This particular device apparently is in the form of a bell means, similar to the earlier style of door bell, and which was clanged by means of the rotation of its associated striker, to indicate when fuel is flowing through the nozzle.

The U.S. Pat. No. 2,847,969, to Woodruff, shows another form of fluid flow indicator, for use within a pipeline, and in this particular instance, there are disclosed a series of ball elements, or vaned sphere, to indicate fluid flow.

The U.S. Pat. No. 2,884,891, to Barker, shows another form of fluid flow indicator. Obviously, as fuel flows through the body passage, of this indicator, it simply turns its associated impeller blades, for revolving of its integral ring. This device, as can be seen, incorporates a transparent dome for visual observance.

The U.S. Pat. No. 3,334,821, Garrison, discloses an anti-spill filling hose nozzle. It incorporates a window pane within the structure of its nozzle apparently for observance purposes.

The U.S. Pat. No. 3,487,809, to Seaborne, shows a milk flow indicator for a milking machine. This device likewise incorporates a form of cap-like member, which apparently is rotated when the milk encounters the grooves or spirals of the shank, to indicate milk flow. As can be seen, its container or bowl is transparent.

The U.S. Pat. No. 4,105,095, to Thrasher, Jr., discloses an injector lubricating apparatus. This device apparently is for use within a lubricator, of the injection pipe type, and incorporates various transparent inserts, and also a cup, so that the ball can be seen in its movement as when lubricant is being forced through the apparatus.

A U.S. Pat. No. 4,559,982, to Fink, comprising the same inventor herein, discloses a porous flow restrictor, for a poppet, but is not meant to comprise any form of means for observing fluid flow.

The U.S. Pat. No. 4,745,877, to Chang, discloses a rotary sight flow indicator. This device provides for a visual indication of fluid flow due to the housing being incorporated within a pipeline, with a view port providing an observation of the rotor assembly, as an indication of fluid flow.

Finally, the U.S. Pat. No. 4,819,577, to Campau, shows another form of fluid flow indicator. This device is a transparent coupling incorporated within a flow line, and has a series of balls rotated therein as a result of the channelized flow of fluid through its associated disc.

The current invention, on the other hand, incorporates a sight glass in association with the poppet structure of a fuel dispensing nozzle, and provides an actuation means therein, so that as fluid flows through the flow channel furnished through the nozzle, the activation means may be moved, to provide a visual observance that fuel is actually flowing through the nozzle, during its dispensing.

SUMMARY OF THE INVENTION

This invention relates generally to fuel dispensing, and more specifically is concerned with the provision of means for furnishing a ready indication and observance that gasoline is flowing through a fuel nozzle during its dispensing.

This invention contemplates the formation of a fuel dispensing nozzle, generally of the type that is employed in the automobile service station, with modifications being constructed into the nozzle, particularly at the vicinity of its poppet valve, or the cap that holds it therein, to provide a ready indication for one to see when fuel is actually flowing through the nozzle. More specifically, this invention provides activation means, whether it be in the form of an impeller, one or more balls, or other means that are readily moved, by flowing fuel, under pressure, that are generally confined within the region of the spring that mounts a poppet valve in place, within a fuel dispensing nozzle. Directly there-above, and readily observed by particularly one who is delivering gas at a self-service station, by means of its nozzle into the fuel tank, of an automobile, a sight glass is provided above the poppet, which is normally arranged in the region of the top side of the nozzle, so that the vehicle operator can readily observe through a sight glass that fuel is passing through the nozzle, as a ready indication that fuel is actually being dispensed, and flowing under pressure through the nozzle and into the vehicle's fuel tank. More specifically, the cap that either threadily engages or pressure fits within the nozzle, and which holds it poppet spring in place, is provided with an opening therethrough, and into which a sight glass, either of regular glass, or having some magnifying attributes, can be readily sealed therein, either by an adhesive, or by a pressure ring, provides a port through which the activation means, of the type as previously explained, may be observed. Thus, if when the operator believes they are dispensing fuel, but that the activation means are static, this may indicate to the vehicle operator that something is wrong, and that the dispenser is not delivering gasoline to his/her automobile. On the other hand, the operator will have the psychological advantage of seeing the fuel actually passing through the nozzle, while it is being dispensed, if the dispenser is, as normally, operating effectively and in proper order, since the balls or spinner will be disrupted or rotating, rather violently, due to the rapid passage of fuel under pressure through the nozzle, by-passing its now opened poppet, for discharge through the nozzle spout and into the fuel tank of the automobile.

It is, therefore, the principle object of this invention to provide sight means associated with a fuel dispensing nozzle and which provides a ready indication that fuel is being properly dispensed.

It is another object of this invention to provide a sight glass for incorporating within a fuel dispensing nozzle and which uses the body cap that covers the poppet chamber or cavity to afford a clear view of the fuel as it passes through the nozzle as may be readily observed.

Still another object of this invention is to provide activation means in the form of balls or spinner within the poppet cavity that readily shows fuel flowing through the nozzle, while passing through its cavity, for delivery to the vehicle.

Still another object of this invention is to provide a sight glass within a fuel dispensing nozzle and which is magnified for enhancing the sighting of fuel flowing through the nozzle during dispensing.

Yet another object of this invention is to provide a nozzle incorporating a non-magnifying lens therein, and which indicates fuel flow either due to the bouncing balls, or the rotation of a spinner, motivated through the passage of fuel under pressure therethrough.

These and other objects may become more apparent to those skilled in the art upon undertaking a study of the description of the preferred embodiment of this invention, in view of its drawings.

DESCRIPTION OF THE PREFERRED EMBODIMENT

Figures 1, 2, 3, 4, 5, 6:
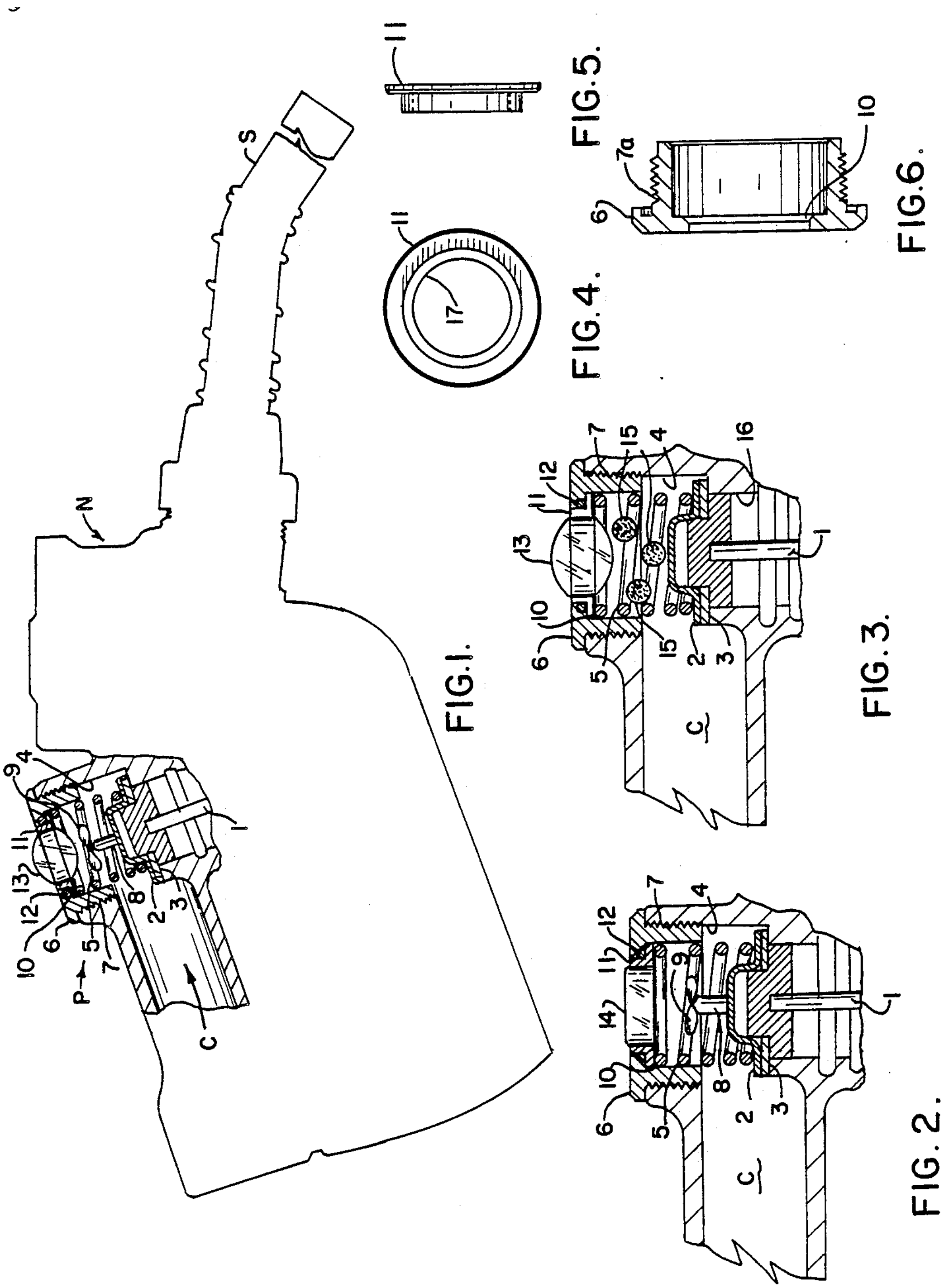
FIG. 1 is a schematic outline of a fuel dispensing nozzle, showing the installation of the sight glass and its activation means installed in the vicinity of its poppet.
FIG. 2 is a cross-sectional view of the sight glass and activation means, slightly enlarged, to that as shown in FIG. 1, with the sight glass being a non-magnified lens.
FIG. 3 is a sectional view similar to that as shown in FIG. 1, with the sight glass being magnified, and the activation means being a series of spheres.
FIG. 4 is a sight glass retainer for use in holding the lens to the body cap.
FIG. 5 is a side view of the nonmagnified flanged lens holder.
FIG. 6 is a cross-sectional view of a body cap and which holds the sight glass retainer, that threadily engages within the poppet cavity.

In referring to the drawings, and in particular FIG. 1, the schematic of a fuel dispensing nozzle is shown at N, generally provided in outline form, but a partial cross-section is furnished of that segment of the nozzle in the vicinity of its poppet valve P, as can be noted. More specifically, and in the usual structure of such a nozzle, there is a fuel channel, as at C, that leads in the upper back of the nozzle handle, and through which fuel is delivered by the hose from the dispenser (not shown), such that when the handle of the nozzle is actuated, and lifted, its stem 1 lifts the poppet valve 2 off of its valve seat 3, thereby allowing fuel to continue its flow through the nozzle, and eventually out of its spout S, for delivery to the fuel tank of any vehicle.

The embodiment of this invention, as can be seen, is to provide means for enhancing the assurance to the vehicle owner that fuel is actually passing through the nozzle, as it is being registered and recorded upon the dispenser, thereby providing a ready indication and observance that, in fact, fuel is passing under pressure through the nozzle during dispensing. To achieve this, the nozzle normally includes a poppet cavity, as at 4, and included in this cavity is the poppet spring 5, normally held tightly biasing against the upper portion of the poppet valve, as can be seen, through the emplacement of its body cap 6 as threadily engaged within the nozzle cavity, as shown at 7. In this particular instance, a small column 8 is fastened to the top of the poppet valve 2, as noted, and provided thereon is a spinner 9. Thus, when fuel flows through the channel C, as when the poppet valve is opened, thereby allowing the fuel to flow under pressure and with some degree of velocity through the nozzle, it has a tendency to rotate the spinner 9, to provide a ready indication that fuel is indeed properly flowing through the nozzle. On the other hand, when the nozzle is shut off, as through either a release of its handle, or when the automatic shut-off means of the nozzle is actuated to provide for a closure of the said poppet valve, when the poppet valve does close and seal upon its valve seat 3, fuel is prevented from passing through the nozzle, and as a result, the spinner 9 will cease to rotate. Thus, one may readily observe that the nozzle is shut off, and it is now safe to retract it from its insertion within the fuel tank, or its delivery pipe, as at the end of a filling of the vehicle gasoline tank.

As can further be noted in FIG. 1, the body or poppet cap 6 includes an opening therethrough, as at 10, and provides means for holding of the lens therein, either directly by means of sealing, through the use of a retainer, such as at 11, or otherwise sealed into position by means of the O-ring 12. See also FIGS. 2 and 3. A further opening is provided within the retainer 11, and a sight glass, as at 13, is sealed therein, in order to provide a ready indication for observation of the spinner 9, by the person utilizing the nozzle for dispensing gasoline. In this particular instance, the lens 13 is of the magnifying type, so as to accentuate the viewing of the spinner 9, for a ready indication and determination as to when it is operating, or nonoperating.

As can be seen in FIG. 2, a modification to the structure of this invention is disclosed. But, most of the components as shown herein are similar to that which has been previously described, and as a result, the same reference characters are noted for identifying equivalent components. But, in this particular instance, the sight employed is of the non-magnifying type, as can be seen at 14. Nevertheless, it still provides a clear view for observation of the spinner 9, to determine when it is rotating, as when fuel is effectively passing through the nozzle, as during delivery, or when the nozzle has been shut off, since the spinner will cease its rotation.

The modification to the invention as shown in FIG. 3 is as follows. Once again, the reference characters as provided, and which are the same as those as previously described for the identified components in FIG. 1, are identical within this figure. The change in this embodiment, though, is the arrangement of a series of activation means, in this particular instance comprising a series of balls or spheres, as at 15, and which are confined within the poppet spring 5, during usage of this nozzle. As can be seen, when the poppet valve 2 is opened, thereby allowing the flow of fuel through the channel C, the balls 15 will have a tendency to be agitated, quite extensively, to provide a ready indication that fuel is indeed passing through the nozzle, and is being delivered to the fuel tank. The movement of these spheres can be readily observed by looking through the magnifying lens 13, as noted. Obviously, as the poppet valve is lifted from its seat, the fuel will flow around the entire circumference of the said valve, to attain entrance into the nozzle cavity, as at 16, for immediate and routine delivery to the spout S, and discharge into the vehicle's fuel tank.

The retainer or retaining ring 11 is of the type for use for holding a nonmagnified lens, wherein the lens remains in the central portion, and includes a flanged means as shown at 11, as disclosed in FIGS. 4 and 5, and normally provides for its pressure fit within the opening 10 provided through the body or nozzle cap 6, while likewise embracing the O-ring or seal ring 12 therein, to seal in any fuel, and prevent its untimely discharge at this location. Furthermore, as can be seen, the opening, as at 17, will hermetically seal either the magnifying lens 13, or the nonmagnifying lens 14, therein, so as to likewise prevent the untimely discharge or leakage of fuel therethrough. The body cap or poppet retaining cap 6 is shown in FIG. 6, and it is within its opening 10 that the retainer 11 inserts, for securing whatever type of lens may be embodied within the operating nozzle. Likewise, as can be seen, this cap may be threadily engaged at 7*a*, to the nozzle at 7, within the cavity 4, as can be noted, or it is just as likely that this poppet may provide for its slide retention therein, in a pressure fit manner, so as to prevent the leakage of any fuel at this vicinity of the poppet, and from its nozzle handle.

Generally, the subject matter of this invention, as previously summarized and reviewed, is to provide that activation means within the poppet cavity, either in the form of a spinner 9, or in the agitating balls 15, to provide that ready indication to the dispenser that fuel is actually passing through the nozzle, during its delivery. Or, in the alternative, it likewise presents a ready indication to the dispenser that fuel has ceased to flow through the nozzle, if the activation means becomes static, which means that it is now safe for the vehicle operator to remove the nozzle, and replace it back into the dispenser, at the end of any fuel dispensing function. Thus, these are moments of ready observation that can be undertaken by the vehicle operator himself/herself, particularly when operating a self-service dispenser nozzle, as are so commonly prevalent at contemporary service station.

Figure 7:
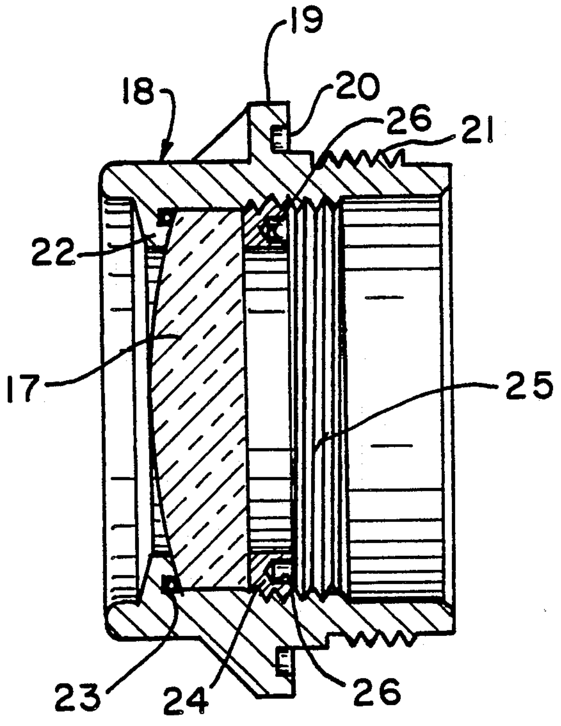
FIG. 7 is a cross-sectional view of a body cap shown incorporating a threaded internal retaining ring to hold the lens in the body cap, that threads into the poppet cavity.

A further embodiment, and the preferred embodiment of this invention, particularly when used for holding a magnified lens, as at 17, into position for viewing of the balls or spinner that may be contained within the poppet cavity, is readily disclosed. As can be seen in FIG. 7, the retainer 18 is fabricated of some length, and includes a formed circumferential flange, as at 19, and which may hold an O-ring, as within the cavity 20, to seal it tightly against the poppet body, as noted, by means of the threaded engagement of the threads 21 within the poppet cavity 4, in conjunction with the threads 7. Thus, when this retainer is tightly threaded into position, any O-ring located at 20 will seal tightly against the poppet body, to tightly seal this retainer in place. Internally, and proximate the exterior opening of the retainer 18, is an inwardly directed shoulder or flange, as at 22, and which is designed for embracing another O-ring, or other means for sealing, as shown at 23, tightly against the upper convex of the formed magnified lens 17, as can be seen. To assure a tight fit of the lens into position, a further internally arranged retainer ring 24 threadedly engages upwardly in conjunction with the internal threads 25 formed of the retainer 18, and by tightly fitting the internal retainer 24, up against the magnified lens 17, it assures its tight locating into position, and to prevent the leakage of any fuel therefrom, as during application and usage of the nozzle in which this device locates. Obviously, there really does not need to be any form of seal located at this position, since the arrangement of the O-ring 23 will prevent the fluid leakage, from this retainer. As can further be seen, counterbores, as shown at 26, may be provided to facilitate the insertion of any tool required to provide for the snug tightening of the internal retainer 24 within the retainer means 18, when tightly locating the magnifying lens 17 into its sealed position. This is the preferred embodiment for locating and retaining in a sealed condition, a magnifying lens within a retainer that tightly locates with respect to the poppet cavity, as previously explained, in order to afford clear viewing of any fluid activated means within the poppet cavity, so as to assure the dispenser that fuel is actually flowing through the nozzle, or that fuel dispensing has been curtailed, particularly under self-serving conditions.

Variations or modifications to the subject matter of this invention may occur to those skilled in the art upon reviewing the subject matter of the disclosure as made herein. Such variations or modifications, if within the spirit of this invention, are intended to be encompassed within the scope of any claims to patent protection issuing upon this development. The description of the preferred embodiment set forth herein is done so for illustrative purposes only.

Having thus described the invention what is claimed and desired to be secured by Letters Patent is:

1. In a fluid dispensing nozzle for attachment to a flow line and for application and delivering a quantity of fluid through a flow channel in the nozzle and to a reserve for usage, said nozzle being of the type incorporating a nozzle body attaching a spout, and with the body incorporating a poppet valve manipulated by handle for delivery of fluid under pressure to said reserve, the improvement comprising, said nozzle body having a cavity with an exterior opening therein and communicating with the nozzle flow channel for use in the disposition of a poppet valve therein, said cavity having a cap attaching upon the opening and providing for its closure and retention of the poppet valve therein, a sight glass provided within the cap for furnishing viewing into the poppet cavity, and fluid activated means provided within the cavity and motivated by the passing fluid to provide observance for detecting the passage of fluid through said nozzle during its dispensing.

2. The invention of claim 1 and wherein said nozzle provides for passage of flowable fuel therethrough.

3. The invention of claim 2 and wherein said nozzle provides for passage of gasoline fuel therethrough.

4. The invention of claim 3 and wherein said activated means comprising a spinner rotated by the passing fuel.

5. The invention of claim 3 and wherein said activated means comprising at least one ball disposed within the cavity and motivated by the passing fuel.

6. The invention of claim 5 and including a poppet spring arranged within the cavity and biased by the cap for urging the poppet valve into closure, and said ball confined within said spring.

7. The invention of claim 3 and including said cap having an upper wall, an integral and downwardly extending sleeve for engagement with the nozzle within its cavity, and said upper wall having an opening therein for mounting of the sight glass thereto.

8. The invention of claim 7 and wherein said sleeve is threaded providing for its threaded engagement within the nozzle cavity.

9. The invention of claim 8 and wherein said upper wall of the cap having an internally arranged shoulder, against which the sight glass may seal, an internal retainer means threadedly engaged within the sleeve, to bias against the sight glass and hold it into position within said sleeve, and said sleeve having externally arranged threads to provide for securement of the sleeve within the poppet cavity.

10. The invention of claim 7 and wherein said cap and its downwardly extending sleeve being pressure fit within the nozzle cavity.

* * * * *

UNITED STATES PATENT AND TRADEMARK OFFICE

CERTIFICATE OF CORRECTION

PATENT NO. : 4,993,460

DATED : Feb. 19, 1991

INVENTOR(S) : Thomas L. Robinson, Thomas O. Mitchell, and Arthur C. Fink, Sr.

It is certified that error appears in the above-indentified patent and that said Letters Patent is hereby corrected as shown below:

Title page, item [75]

Please change the name of the co-inventor "Arthur C. Fink, Sr., to ---Arthur C. Fink, Jr.---.

Signed and Sealed this

Fourteenth Day of December, 1999

Attest:

Q. TODD DICKINSON

Attesting Officer

Acting Commissioner of Patents and Trademarks